July 5, 1932.   G. A. SEELEY   1,866,272
CABLE FORMING APPARATUS
Filed March 1, 1930
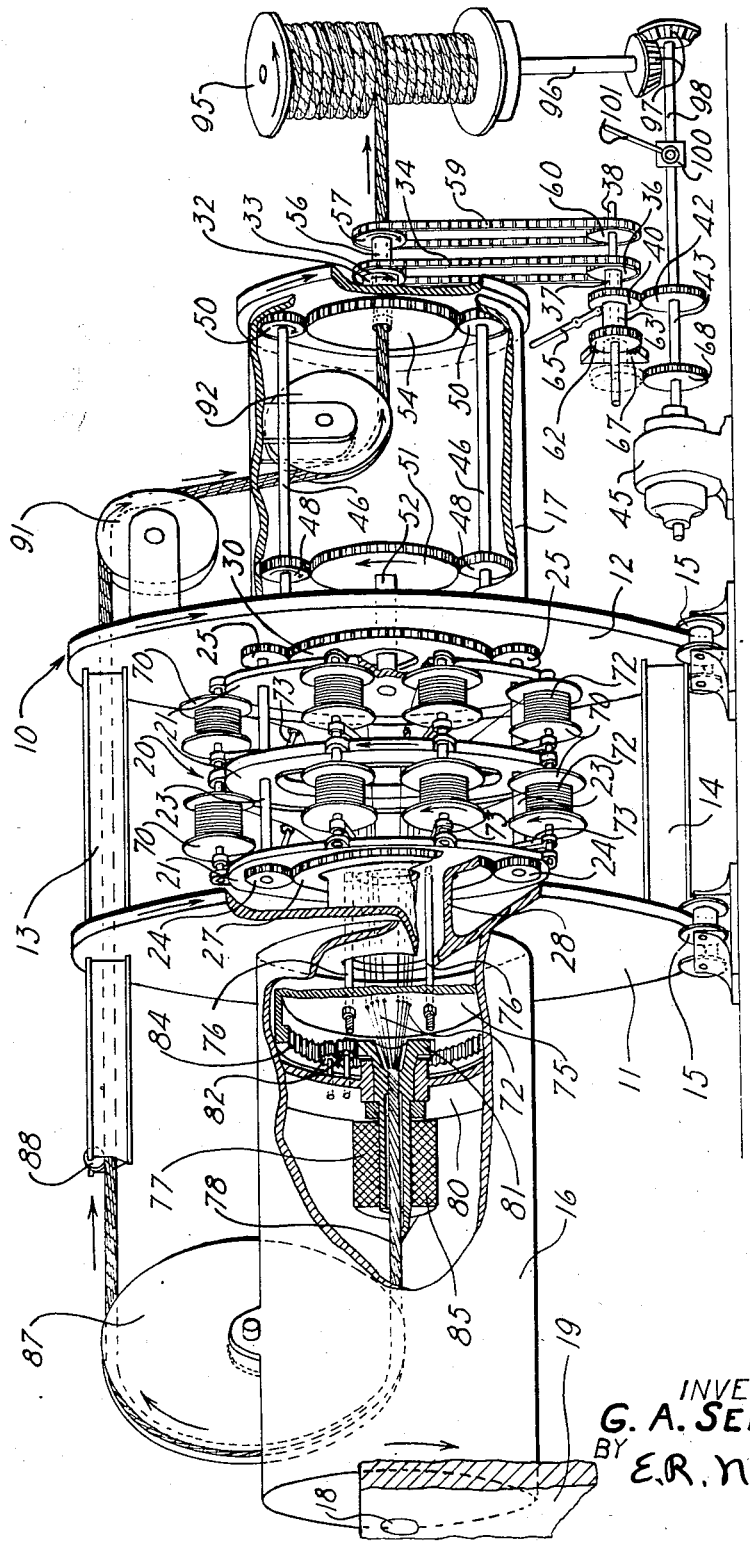
INVENTOR
G. A. SEELEY
BY E. R. Nowlan
ATTORNEY

Patented July 5, 1932

1,866,272

UNITED STATES PATENT OFFICE

GEORGE A. SEELEY, OF BALTIMORE, MARYLAND, ASSIGNOR TO WESTERN ELECTRIC COMPANY, INCORPORATED, OF NEW YORK, N. Y., A CORPORATION OF NEW YORK

CABLE FORMING APPARATUS

Application filed March 1, 1930. Serial No. 432,334.

This invention relates to cable forming apparatus, and more particularly to apparatus for assembling a plurality of strands into a single compact cable.

An object of the invention is to provide an improved cable forming apparatus whereby cables of the above type may be produced efficiently and with a minimum amount of skill and attention on the part of the operator.

The invention contemplates the provision of a cable forming apparatus wherein a plurality of strands, drawn from individual supply reels arranged concentrically about a cylindrical drum or carrier, are assembled into a compact group and thereafter twisted together by being carried bodily around the supply reels by means of a flier rotated around the supply carrier. The supply carrier is rotated by the rotation of the flier at a lower speed and preferably in a direction opposite to that of the flier, whereby the individual supply reels are successively presented to the operator for inspection.

It is believed that the invention will be clearly understood from the following detailed description when read in conjunction with the accompanying drawing, in which the single figure is a schematic perspective view, partly broken away, of a cable forming apparatus embodying the features of the invention.

Referring now to the drawing, it will be observed that a rotatable member or flier is indicated generally by the numeral 10, and comprises a pair of spaced annular disks 11 and 12 interconnected by cross beams 13 and 14 and rotatably supported upon grooved rollers 15, 15. The disks 11 and 12 are formed with coaxial outwardly extending tubular portions 16 and 17, respectively, the portion 16 terminating in a reduced hub portion 18 whereby it is rotatably journalled in a suitable supporting standard 19.

A strand supply carrier 20, comprising a plurality of spaced, rigidly interconnected, annular members 21, 21 is mounted between the spaced disks 11 and 12 of the flier. Rotatably journalled in the annular members 21 of the supply carrier are a plurality of horizontal shafts 23, 23 equidistantly spaced from the longitudinal axis of the carrier. Each of the shafts 23 has a small planet gear 24 fixed upon one end thereof and a similar gear 25 fixed upon its opposite end. The planet gears 24 are arranged to engage a cooperating sun gear 27 co-axial with the disk 11 of the flier and secured to or formed integral with an inwardly projecting tubular portion 28 thereof. The planet gears 25 are arranged to engage a cooperating sun gear 30, similar to the gear 27 and co-axial with and carried by the disk 12 of the flier. Through the planetary gearing arrangement just described, it will be obvious that the flier 10 and the supply carrier 20 are rotatable with respect to each other about a common axis of rotation.

The tubular portion 17 of the flier is formed at its outer end with a reduced hub portion 32 having a sprocket 33 affixed thereto which is connected by an endless chain 34 to a sprocket 36 secured to a sleeve 37 rotatably carried upon a horizontal shaft 38. A gear 40 slidably keyed to the sleeve 37 is driven by a gear 42 keyed to a main drive shaft 43 connected to an electric motor 45.

Rotatably journalled in the tubular portion 17 of the flier are a plurality of horizontal shafts 46, 46 equidistantly spaced from the longitudinal axis of the flier. Each of the shafts 46 has a planet gear 48 secured thereto adjacent to the disk 12 of the flier. Fixed upon the opposite end of each of the shafts 46 is a planet gear 50, similar to but having a lesser number of teeth than the planet gears 48. The planet gears 48 are arranged to engage a cooperating sun gear 51 keyed to a shaft 52 which extends through the central apertures of the annular flier disk 12 and gear 30, and is rigidly secured to the right hand end member 21 of the supply carrier 20. The planet gears 50 are arranged to engage a cooperating sun gear 54, similar to but having a greater number of teeth than the sun gear 51. In the present embodiment of the invention, the planet gears 48 are each provided with one tooth more than the planet gears 50, and the sun gear 51 is formed with one tooth less than the sun gear 54. The purpose of this construction will become apparent as the description progresses.

The sun gear 54 is fixed upon the inner end of a tubular shaft 56 rotatably journalled in the hub portion 32 of the flier. A sprocket 57 keyed to the outer end of the shaft 56 is connected by an endless chain 59 to a sprocket 60 secured to the shaft 38. A gear 62 is slidably keyed to the shaft 38. The gears 40 and 62 are interconnected by a sleeve 63 in such manner that they are slidable as one unit but rotatable with respect to each other. By means of a shift lever 65 connected to the sleeve 63, the gears 40 and 62 may be shifted to either of two positions. In one of these positions, the gear 40 is operatively engaged with the gear 42 on the drive shaft 43, while the gear 62 is engaged with a stationary rack 67 and is thereby locked against rotation. In the other position, the gear 40 is disengaged from the drive gear 42 and engaged with the rack 67, while the gear 62 is disengaged from the rack and engaged with a gear 68 keyed to the drive shaft 43.

Rotatably supported in suitable bearings formed on the peripheries of the annular members 21 of the carrier 20 are a plurality of spools or reels 70, 70, each containing a supply of strand material 72, such as wire or the like. The supply reels are provided with suitable tension controlling arms 73, 73 which carry, at their extremities, suitable guide sheaves or pulleys over which the strands 72 drawn from the supplies are guided through the central apertures of the annular carrier members 21, gear 27, and flier disk 11, to a distributor plate 75 carried by the supply carrier by means of a plurality of rods 76, 76 secured to the left hand end member 21 of the carrier. The distributor plate 75 is provided with a plurality of spaced apertures for guiding the individual strands and for determining their ultimate relative positions in the finished cable.

From the distributor plate 75, the strands pass through a bell mouthed bushing 77 wherein they are assembled into a single compact group or bundle 78 of circular cross section. The bushing 77 is rotatably journalled in a bearing plate 80 secured to or formed integral with the tubular portion 16 of the flier. Formed upon or secured to the bushing 77 is a gear 81 which, through intermediate idler gears 82, 82 carried by the flier plate 80, is driven by an internal ring gear 84 carried by the distributor plate 75, in such manner that the bushing 77 is rotated in a direction opposite to that of the flier 10. A supply cop 85 of cotton strand or other suitable binding material is mounted upon and secured to the bushing 77, and it will be understood that the binding material is drawn from the cop 85 and spirally wrapped around the assembled group of strands as it emerges from the end of the bushing. In this manner, the assembled group of strands are tightly bound together with the individual strands maintained in their proper relative positions as predetermined by the distributor plate 75.

The bound group of strands is drawn over a guide sheave 87 rotatably carried by the tubular portion 16 of the flier and disposed tangentially with respect to the longitudinal axis of the flier. From the sheave 87 the bound group of strands passes under an idler sheave 88 carried by the beam 13, through suitable apertures in the flier disks 11 and 12, and then around guide sheaves 91 and 92 rotatably carried by the disk 12 and tubular portion 17 of the flier. It will be observed that the sheave 92 is disposed tangentially with respect to the axis of the flier.

From the guide sheave 92 the finished cable passes through the tubular shaft 56 to a suitable take-up reel 95 driven by a shaft 96, bevel gears 97 and a shaft 98, the latter shaft being connected to the main drive shaft 43 through a suitable clutch 100 operated by a hand lever 101. It will be understood, of course, that any suitable means may be interposed between the flier and the take-up reel for drawing the cable through the flier and delivering it to the take-up reel. In the present embodiment of the invention, as illustrated diagrammatically in the drawing, the take-up reel 95 also functions as a capstan.

The operation of the above described apparatus is as follows: The strands from the supply reels are threaded through the distributor plate 75 and bushing 77, around the guide sheaves 87, 91, and 92 of the flier, through the tubular shaft 56, and are then attached to the take-up reel 95. The lever 65 is then shifted to the position shown in the drawing, wherein the gear 40 engages the drive gear 42 and the gear 62 engages the stationary rack 67 and is thereby restrained against rotation. The clutch 100 being engaged, the driving motor 45 is started thereby rotating the flier and the take-up reel in the directions indicated by the arrows, through the chain drive and gearing hereinbefore described. The planet gears 50 are carried by the rotating flier around the sun gear 54, the latter being restrained against rotation due to the locking engagement of the gear 62 with the stationary rack 67. In traveling around the stationary sun gear 54, the planet gears 50 are rotated about their individual axes, thereby rotating the shafts 46 and causing a corresponding rotation of the planet gears 48. In other words, each complete rotation of the planet gears 50 causes one complete rotation of the planet gears 48. However, since the gears 48 have one more tooth than the gears 50, while the gear 51 has one tooth less than the sun gear 54, it will be apparent that with each rotation of the gears 48, the gear 51 and thereby the supply carrier 20 will be rotated an amount corresponding to one tooth of the gear 51. Thus, the supply carrier 20 makes one complete revolution while the gears 48 make a number of revolutions equal to the number of teeth in the gear 51. By providing a large number of teeth in the gear 51, the supply carrier is rotated very slowly through the rotation of the flier, and thus the individual supply reels are successively presented to positions within the view of an operator stationed in front of the apparatus, whereby they may be inspected by him conveniently without stopping the operation of the apparatus. Also, broken or entangled wires, and supply reels becoming exhausted are thus called to his attention immediately.

When it is desired to replenish one or more of the strand supplies, the motor 45 is stopped and the clutch 100 is disengaged, after which the gears 40 and 62 are shifted by the lever 65 to positions wherein the gear 40 engages the stationary rack 67 and the gear 62 engages the drive gear 68 as indicated in dotted outline in the drawing. With the flier 10 thus locked against rotation, the supply carrier may be rotated by starting the motor 45 to advance any of the supply reels to positions within convenient reach of the operator. Upon starting the motor 45, the gear 68 drives the gear 62 which, in turn, drives the shaft 38 and thereby the sprocket 60. The sprocket 57 and thereby shaft 56 and gear 54 are driven from sprocket 60 by chain 59. Rotation of the gear 54 causes gears 50 carried by the stationary flier to rotate about their individual axes, thus causing a corresponding rotation of gears 48, whereby gear 51 and thereby the supply carrier 20 is rotated around the stationary gears 27 and 30 of the flier.

It will be understood that the invention is not limited to the specific embodiment thereof herein illustrated and described but is capable of other applications within the scope of the appended claims.

What is claimed is:

1. In a cable forming apparatus, a rotatable strand supply carrier, a plurality of strand supplies mounted upon the carrier, a flier for carrying the strands from the supplies bodily around the carrier, means for rotating the flier, means responsive to the rotation of the flier for rotating the supply carrier and means for rotating the carrier independently of the flier.

2. In a cable forming apparatus, a rotatable strand supply carrier, a plurality of strand supplies mounted upon the carrier, a flier rotatable about an axis coinciding with the axis of the carrier for carrying the strands from the supplies bodily around the carrier, means for rotating the flier, means carried by the flier and rendered effective by the rotation thereof for rotating the supply carrier at a different speed than the flier, means for preventing said flier from rotating, and means for rotating the carrier while said flier is prevented from rotating.

3. In a cable forming apparatus, a rotatable strand supply carrier, a plurality of strand supplies mounted upon the carrier, a flier for carrying the strands from the supplies bodily around the carrier, means for rotating the flier, means carried by the flier and responsive to the rotation thereof for rotating the supply carrier in a direction opposite to that of the flier and means for rotating the carrier independently of the flier.

4. In a cable forming apparatus, a rotatable strand supply carrier, a plurality of strand supplies mounted upon the carrier, a flier for carrying the strands from the supplies bodily around the carrier, means for rotating the flier, a gear rotatable with the supply carrier, and means carried by the flier for rotating the gear and thereby the carrier.

5. In a cable forming apparatus, a rotatable strand supply carrier, a plurality of strand supplies mounted upon the carrier, a member rotatable around the carrier for carrying the strands from the supplies bodily around the carrier, means for rotating the flier, and a train of gears interconnecting the flier and the carrier and effective through the rotation of the flier for rotating the carrier at a different speed than the flier and in a direction opposite to that of the flier.

6. In a cable forming apparatus, a rotatable strand supply carrier, a member rotatable around the carrier, means for rotating the member, and a system of gears interconnecting the carrier and the member whereby the carrier is rotated by the rotation of the member.

7. In a cable forming apparatus, a rotatable strand supply carrier, a plurality of strand supplies supported thereby, a flier rotatable with respect to the carrier and co-axial therewith, means for rotating the flier, a stationary gear co-axial with the flier, a shaft rotatable in the flier, a gear secured to the shaft and rotatable by the stationary gear through the rotation of the flier to thereby rotate the shaft, and means responsive to the rotation of the shaft for rotating the supply carrier.

8. In a cable forming apparatus, a rotatable strand supply carrier, a plurality of strand supplies supported thereby, a flier rotatable around the carrier for twisting the strands, means for rotating the flier, and means rendered effective by the rotation of the flier for rotating the carrier, the last mentioned means comprising a gear secured to the carrier and co-axial therewith, a stationary gear co-axial with the flier, a plurality of shafts rotatable in the flier, a set of gears secured to the shafts and rotatable by the stationary gear through the rotation of the flier to thereby rotate the shafts, and a second set of gears secured to the shafts and engaging the gear secured to the carrier, the gear ratio between the gear on the carrier and the cooperating second set of gears on the shafts being different than the gear ratio between the stationary gear and the cooperating first set of gears on the shafts.

In witness whereof, I hereunto subscribe my name this 21st day of Feb. A. D., 1930.

GEORGE A. SEELEY.